US008812713B1

United States Patent
McConnell et al.

(10) Patent No.: US 8,812,713 B1
(45) Date of Patent: Aug. 19, 2014

(54) AUGMENTING MEDIA STREAMS USING MEDIATION SERVERS

(75) Inventors: Von McConnell, Leawood, KS (US); Jason Robert-Anthony Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 251 days.

(21) Appl. No.: 12/406,466

(22) Filed: Mar. 18, 2009

(51) Int. Cl.
*G06F 15/16* (2006.01)
(52) U.S. Cl.
USPC .......................................... 709/231; 709/203
(58) Field of Classification Search
USPC ........................................................ 709/231
See application file for complete search history.

(56) References Cited

U.S. PATENT DOCUMENTS

| | | | |
|---|---|---|---|
| 2001/0023436 A1* | 9/2001 | Srinivasan et al. | 709/219 |
| 2002/0001395 A1* | 1/2002 | Davis et al. | 382/100 |
| 2006/0064716 A1* | 3/2006 | Sull et al. | 725/37 |
| 2006/0101338 A1* | 5/2006 | Kates | 715/716 |
| 2007/0033531 A1* | 2/2007 | Marsh | 715/738 |
| 2009/0276811 A1* | 11/2009 | Ramaswamy | 725/73 |
| 2010/0054158 A1* | 3/2010 | Mathai et al. | 370/259 |

OTHER PUBLICATIONS

ATSC, ATSC and CableLabs—Interacting for Interactive DTV, vol. Three, Issue Four, Dec. 2002.
Wikipedia, Active Format Description, Mar. 13, 2009.
Triveni Digital, PSIP for LPTV, Oct. 23, 2005.

* cited by examiner

*Primary Examiner* — Noel Beharry (57) ABSTRACT

An embodiment of the current invention is directed to displaying additional data related to a mobile video stream. A mobile video stream is received via a network interface. Metadata related to the mobile video stream is acquired. The mobile video stream is displayed on a display device. A communications link to a mediation server is established. The metadata are communicated to the mediation server. Additional data is received from the mediation server and is displayed.

14 Claims, 5 Drawing Sheets

AUGMENTING MEDIA STREAMS USING MEDIATION SERVERS

SUMMARY

Embodiments of the invention are defined by the claims below, not this summary. A high-level overview of various aspects of the invention is provided here for that reason, to provide an overview of the disclosure, and to introduce a selection of concepts that are further described below. This summary is not intended to identify key features or essential features of the claimed subject matter, nor is it intended to be used as an aid in isolation to determine the scope of the claimed subject matter.

Embodiments of the present invention are related to displaying additional data related to a mobile video stream. A mobile video stream is received via a network interface. Metadata related to the mobile video stream is acquired. The mobile video stream is displayed on a display device. A communications link to a mediation server is established. The metadata are communicated to the mediation server. Additional data is received from the mediation server and is displayed.

BRIEF DESCRIPTION OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ATSC Advanced Television Systems Committee
HTML HyperText Markup Language
HTTP HyperText Transfer Protocol
PSIP Program and System Information Protocol
SIP Session Initiation Protocol
XML eXtensible Markup Language
CDMA Code Division Multiple Access
EVDO Evolution Data/Voice Embodiments of the present invention are directed to, among other things, providing data related to a media stream to a computing device. Wireless computing devices have the ability to receive broadcast, streaming media over the Advanced Television Systems Committee (ATSC) network through the inclusion of an ATSC interface. For example, mobile video streams are a type of media stream that are suitable for streaming over an ATSC interface.

Media streams delivered over the ATSC network include multimedia data (e.g., television shows, movies, advertisements, and video clips). Mobile video streams are streams specifically formatted for viewing on mobile devices. Mobile devices can have small screen sizes, lower-resolution displays, lower-data-rate network links, and smaller power supplies. For example, mobile phones and personal digital assistants (PDAs) are examples of mobile devices. Additionally, many ATSC streams include metadata, giving further information about the content of the media stream. For example, Program and System Information Protocol (PSIP) compliant metadata includes various information about the media stream (e.g., title, description, ratings, captioning, language, broadcast flags, and channel information). Such metadata can be used for a number of purposes, for example, creating a program information panel, displaying the title, description, and ratings of the current media stream.

Wireless computing devices may also have interfaces to other networks in addition to an ATSC network interface. For example, wireless computing devices may have an IEEE 802.11 (WiFi) interface and Code Division Multiple Access-EVolution Data/Voice (CDMA-EVDO) cellular interface. These interfaces allow the wireless computing device to connect to a wide variety of networks (e.g., cellular network, corporate intranets, and the Internet). Each of these networks provides the wireless computing device to acquire further information. For example, a wireless computing device could use the information encoded in the metadata related to a media stream received over an ATSC network to search for additional information relevant to the media stream on the Internet.

According to an embodiment of the invention, a mediation server could be coupled to a network, such as the Internet, to which the wireless computing device is also coupled. The mediation server may be configured to provide additional information related to media streams given various metadata related to the media streams. By way of example, the mediation server could receive a query from a wireless computing device acting as a mediation client, the query containing a list of metadata related to a media stream. According to an embodiment, the wireless computing device could be operable to run a mediation client to send the query and receive and process the response. The mediation server could use an Internet searching algorithm to locate websites with information related to the media stream, based on the metadata and provide a list of those related websites to the wireless computing device as a response to a query. As another example, the mediation server may store interactive media related to a number of different media streams. Upon receiving a request from a wireless computing device for additional data related to a particular media stream, the mediation server could present the interactive media in a reply to the wireless computing device.

Wireless computing devices could display both media streams and data related to media streams in a number of different ways. For example, the media stream could be displayed in a window on the primary display of the wireless computing device. The additional data (e.g., interactive media returned by a mediation server over an Internet connection) may be displayed in a smaller window overlaid on the window displaying the media stream. As another example, the media stream could be displayed on the primary display of the wireless computing device. The additional data could be displayed on an external display coupled to the wireless computing device (e.g., an external monitor coupled by a Bluetooth connection). As a further example, the media stream could be displayed on an external display coupled to the wireless computing device and the additional data could be displayed on the primary display of the wireless computing device.

An embodiment of the invention is directed to displaying additional data related to a mobile video stream. A mobile video stream is received via a network interface. Metadata related to the mobile video stream is acquired. The mobile video stream is displayed on a display device. A communications link to a mediation server is established. The metadata are communicated to the mediation server. Additional data is received from the mediation server and is displayed. According to an embodiment of the invention, space is reallocated on the screen. The additional data is synchronized with the mobile video stream and displayed in the reallocated space. According to other embodiments, the additional data is buffered on the wireless computing device before being displayed. According to further embodiments, other formatting is performed on the additional data before the additional data is displayed.

Another embodiment of the invention is directed to displaying additional data related to a mobile video stream. A mobile video stream with embedded metadata is received over a first network interface. The mobile video stream is displayed. Additional data related to the mobile video stream is requested, based on the metadata, over a second network interface. Additional data related to the mobile video stream is received over the second network interface. The additional data includes information related to the mobile video stream. The additional data is displayed.

A further embodiment of the invention is directed to displaying additional data related to a mobile video stream. A mobile video stream with metadata is received over an ATSC network interface. The mobile video stream includes embedded metadata. The mobile video stream is displayed on a screen on the computing device. A connection to a mediation server is established using Session Initiation Protocol (SIP) over a second network interface. The metadata is sent to the mediation server. Additional data related to the mobile video stream and including information related to the mobile video stream is received from the mediation server over the second network connection. The additional data is displayed on the screen of the computing device simultaneously with the mobile video stream.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
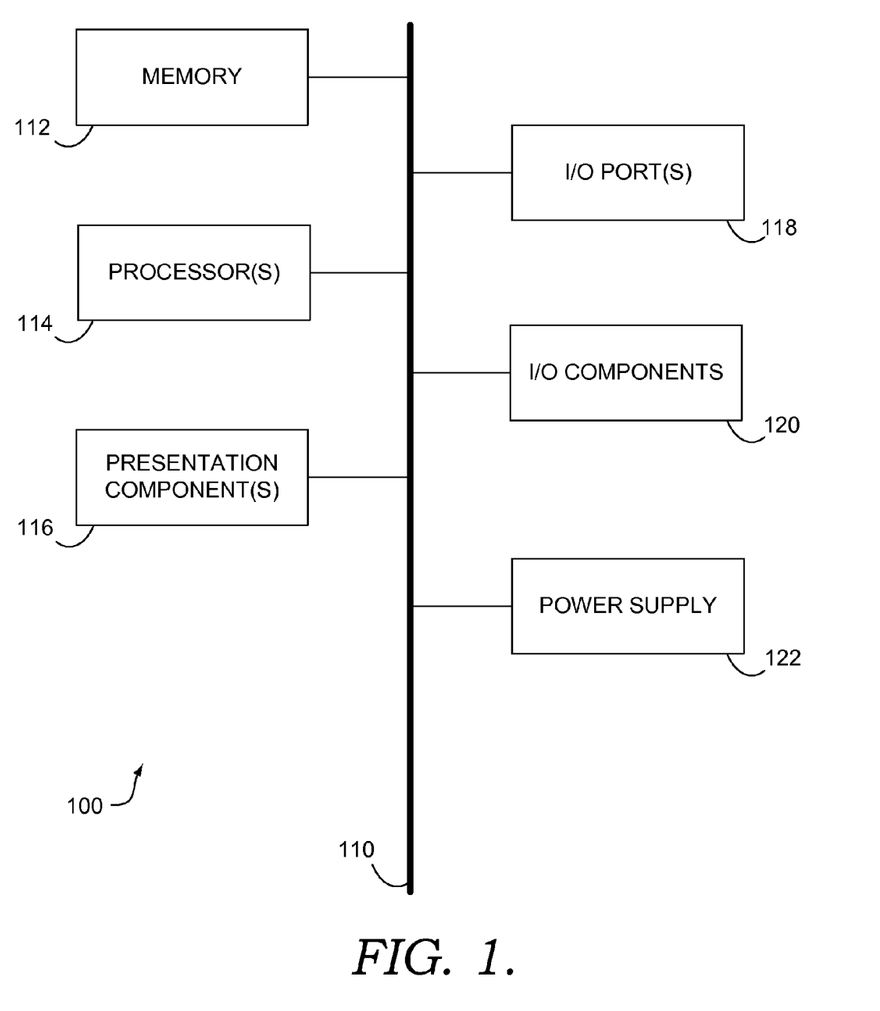
FIG. 1 depicts a block diagram of an exemplary computing environment suitable for implementing an embodiment of the invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and include both volatile and nonvolatile media, removable and nonremovable media. By way of example, and not limitation, computer-readable media may include computer storage media and communication media. Computer storage media include both volatile and nonvolatile, removable and nonremovable media implemented in any method or technology for storage of information such as computer-readable instructions, data structures, program modules or other data. Computer storage media include, but are not limited to, Random-Access Memory (RAM), Read-Only Memory (ROM), Electrically-Erasable, Programmable, Read-Only Memory (EEPROM), flash memory or other memory technology, Compact Disk, Read-Only Memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile memory. Exemplary hardware devices include solid-state memory, such as RAM. Memory 112 includes computer-storage media in the form of non-volatile memory. The memory 112 may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. I/O components 120 present data indications to a user or other device. Exemplary output components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
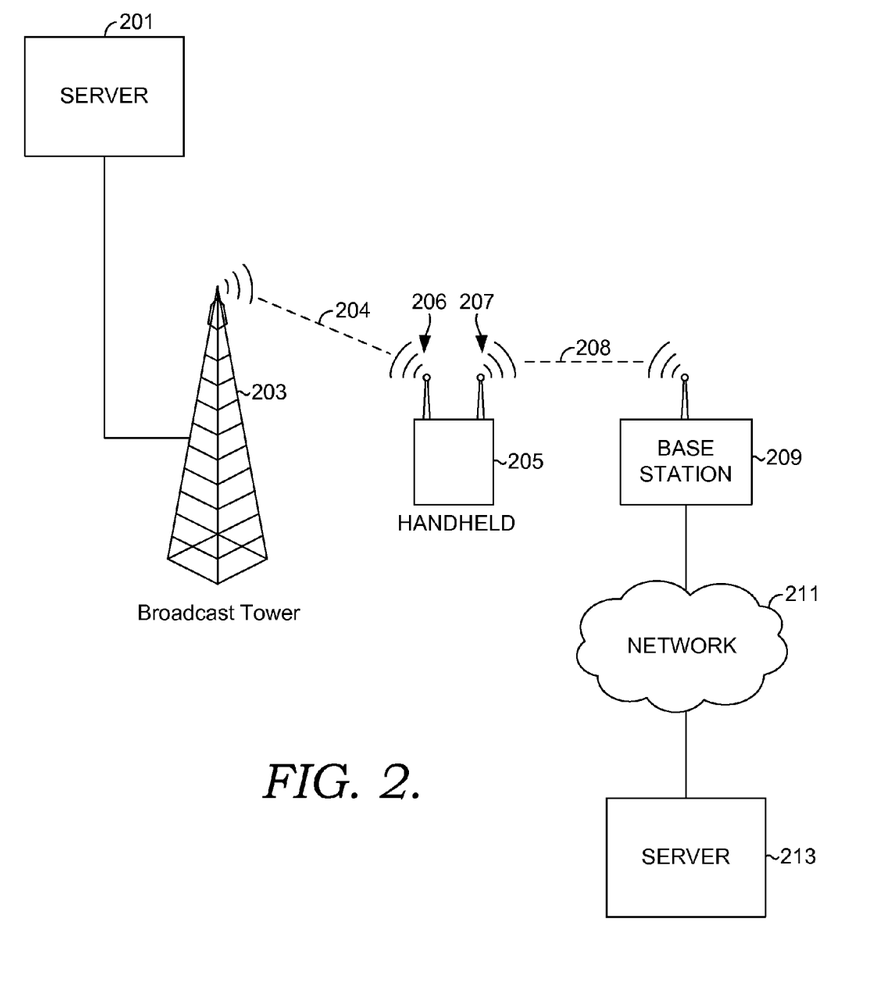
FIG. 2 depicts a block diagram of an exemplary network environment suitable for implementing an embodiment of the invention.

Turning now to FIG. 2, a diagram depicting a network environment suitable for implementing the present invention is given. A wireless computing device, such as a handheld personal digital assistant 205, contains an ATSC network interface 206 and a second network interface 207 (e.g., a CDMA-EVDO network interface). The handheld 205 is coupled to a server 201 capable of providing media streams through an ATSC compatible link 204 to an ATSC broadcast tower 203. Server 201 provides media streams that can include metadata. By way of example, the media stream provided by the server 201 could contain PSIP metadata. PSIP metadata can include a wide variety of information related to the associated media stream. For example, metadata related to title, description, ratings, captioning, language, broadcast flags, and channel information could be contained within the PSIP metadata. As another example, the metadata could be contained in an associated eXtensible Markup Language (XML) format. Many others forms of metadata exist that are suitable for use with embodiments of the invention.

The handheld 205 is also coupled to a basestation 209 over a wireless link 208. There are many wireless technologies that are suitable for providing such a wireless link. For example, a WiFi link, a WiMAX link, and a CDMA-EVDO link are suitable types of links for wireless link 208. The basestation 209 is also coupled to a network 211 containing a mediation server 213. For example, the network 211 could be the Internet. The mediation server 213 is capable of providing additional data related to various media streams in response to a query containing metadata related to a media stream.

There are many types of additional data that could be provided by the mediation server 213. For example, the mediation server 213 could return interactive web sites related to a media stream based on metadata, such as media stream title and description. The mediation server 213 could return information about the actors portraying characters in the media stream or titles of other media streams that are related. The mediation server 213 could provide images of various components of the media stream for viewing in a slideshow format as a further example. There are many forms of additional information that a mediation server 213 could return in response to a query.

Figure 3:
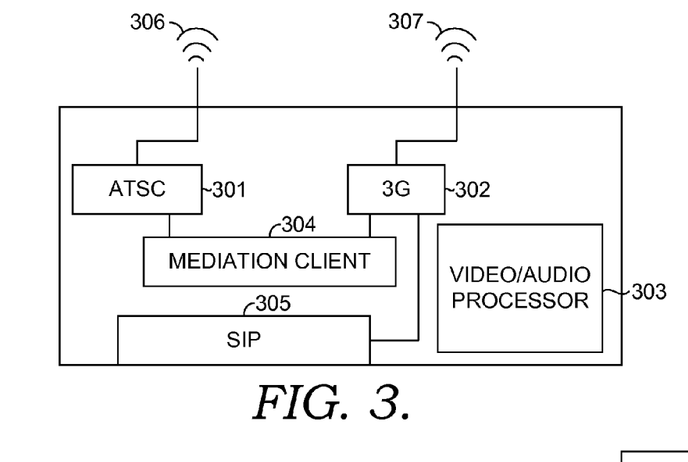
FIG. 3 depicts a block diagram of an exemplary wireless computing device suitable for implementing an embodiment of the invention.

Turning now to FIG. 3, a block diagram of an exemplary wireless computing device 300 is given. The wireless computing device 300 includes an ATSC interface 301 capable of receiving and decoding media streams broadcast on an ATSC network. The ATSC interface is coupled to an antenna 306 and to a mediation client 304. The mediation client 304 is configured to take metadata from the media stream received over the ATSC interface 301 and use it to form queries for additional data. The mediation client 304 is also coupled to a Session Initiation Protocol (SIP) stack 305. The SIP stack can be used to connect to a mediation server on a network using the second network interface 302 (e.g., a CDMA-EVDO network interface). The CDMA-EVDO interface 302 is coupled to an antenna 307. Antenna 307 and antenna 306 could be a single shared antenna. Additionally, the radio circuitry making up the ATSC interface and the second network interface could be a single radio using software-defined radio techniques. The mediation client 304 also has a connection to the CDMA-EVDO interface 302 for communication with a mediation server. Other networking and discovery protocols exist that could be used to facilitate the invention. For example, the SIP stack 305 could be replaced with a Bluetooth protocol stack. As another example, the CDMA-EVDO interface 302 could be replaced with a WiFi interface. The wireless computing device 300 also includes a video/audio processor 303, configured to render, and play audio and video media streams. The video/audio processor 303 could use a local display device, an external display device, or a combination of a number of local and external devices to play media streams.

Figure 4:
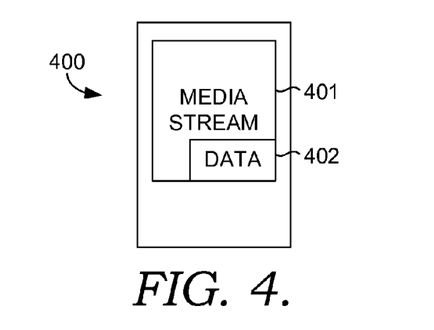
FIG. 4 depicts an exemplary screen of a computing device, in accordance with an embodiment of the invention.

There are a number of ways that both the media stream and the additional data received by a wireless computing device could be displayed. According to an embodiment of the invention, the wireless computing device includes a screen for the display of data. Turning to FIG. 4, a block diagram of an exemplary wireless computing device 400 is shown. The screen on the wireless computing device 400 is used to display the media stream, for example a multimedia stream 401 and some additional data 402. According to an aspect of the invention, the additional data 402 is displayed in a small window overlapping the display of the media stream 401. It is possible for the media stream to be displayed immediately in a window on the screen 401. Any additional data received could be displayed simultaneously in a smaller window 402.

Figure 5:
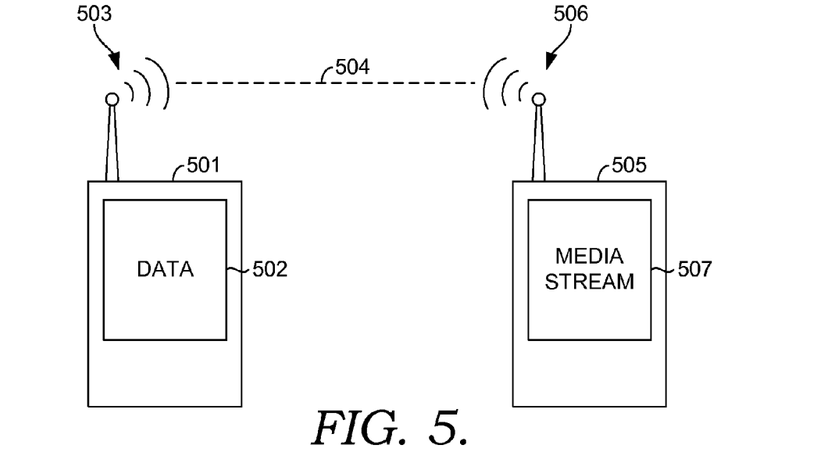
FIG. 5 depicts a block diagram of a computing device and an external interface, in accordance with an embodiment of the invention.

According to another embodiment, the wireless computing device could also be coupled to an external display device. For example, the wireless computing device could be coupled to a television with network capabilities or an LCD screen built into an automobile seat. There are a number of wireless technologies suitable for supporting the connection of external monitors, including Bluetooth and USB. Referring to FIG. 5, a wireless computing device 501 containing a wireless interface 503 (e.g., a Bluetooth interface) is coupled via a wireless link 504 to an external monitor 505 containing a wireless interface 506. The media stream is displayed in a window 507 on the external display device 505. The additional data could be displayed in a window 502 on the wireless computing device 501. There are many other ways in which the multiple possible display devices could be used to display the media stream and additional data. For example, the media stream could be displayed in a window 502 on the wireless computing device 501 and the additional data could be displayed in a window 507 on the external display device 505. As a further example, both the media stream and the additional data could be displayed in a window 507 on the external display 505.

Figure 6:
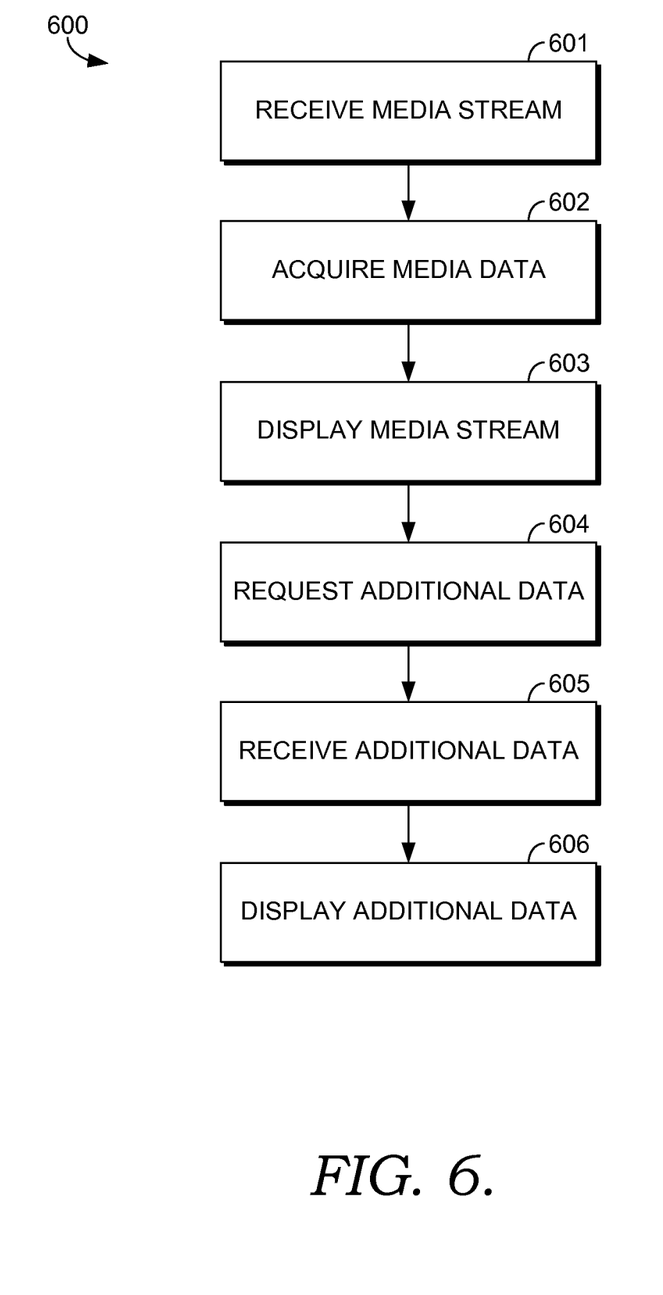
FIG. 6 is a flow diagram showing a method of displaying data related to a media stream, in accordance with an embodiment of the invention.

Turning now to FIG. 6, a flow diagram depicting a method 600 of displaying additional data related to a media stream is given. A media stream is received, as shown at block 601. The media stream could be received over a number of suitable network technologies. By way of example, an ATSC interface could be used to receive a media stream. As another example, a CDMA-EVDO interface could be used to receive a media stream. The media stream could be a video or audio stream, or some combination of other media. By way of example, the media stream could be an ATSC compliant media stream. According to an embodiment of the invention, the media stream could contain embedded metadata. According to a further embodiment, metadata could be received over an independent channel. Metadata could be formatted in a number of ways. By way of example, the metadata could be formatted according to PSIP.

The metadata is acquired, as shown at block 602. The metadata could be acquired by extracting it from the media stream. The metadata could also be acquired by receiving it on a separate channel. Those skilled in the art will recognize there is a wide variety of data that could be included in metadata. By way of example, the metadata could include title, description, ratings, captioning, language, broadcast flags, and channel information.

The media stream is displayed, as shown at block 603. According to an embodiment of the invention, the media stream could be displayed on a screen on the wireless computing device. According to a further embodiment, the media stream could be displayed on an external interface attached to the wireless mobile device. There are a number of suitable external interfaces that could be utilized to display a media stream by a wireless computing device. By way of example, network-enabled LCD monitors, laptop computers, and USB monitors could be used as external display devices. Those skilled in the art will recognize that there are many possibilities for displaying the media stream.

Additional data is requested, as shown at block 604. Additional data could be requested by using a second network interface. For example, a CDMA-EVDO interface, a WiFi interface, and a WiMAX interface are suitable interfaces over which additional data could be requested. The additional data request could be submitted to a number of servers. A mediation server, configured to provide additional information related to media streams given certain metadata could be used to request additional data. As another example, a web server running a search engine could be used to request additional data based on metadata.

Those skilled in the art will recognize that there are a number of protocols suitable for coupling to a provider of additional information. By way of example, a wireless computing device could use SIP to begin a session with a mediation server to receive additional data based on metadata related to a media stream. As another example, HyperText Transfer Protocol (HTTP) could be used to connect to a web server running a search engine.

The additional data is received, as shown at block 605. The additional data could be received over the network interface on which the request was made, as shown in block 604. Those skilled in the art will recognize that there are many formats in which the additional data could be presented. By way of example, eXtensible Markup Language (XML) could be used to present the additional data. The additional data could be synchronized to the mobile video stream. For example, the additional data could be synchronized to the mobile video stream using timeslot markers. As another example, the synchronization could be performed using content sequencing. There are other ways in which synchronization between the additional data and the mobile video stream could be achieved. The additional data is displayed, as shown at block 606. The additional data could be displayed in a window overlapping the media stream. According to a further embodiment, the additional data could be displayed in a window on an external interface. According to another embodiment, the additional data could be displayed on the screen of the wireless computing device, while the media stream is displayed on an external interface. Those skilled in the art will recognize that there are many possible combinations of displaying the additional data while displaying the media stream.

Figure 7:
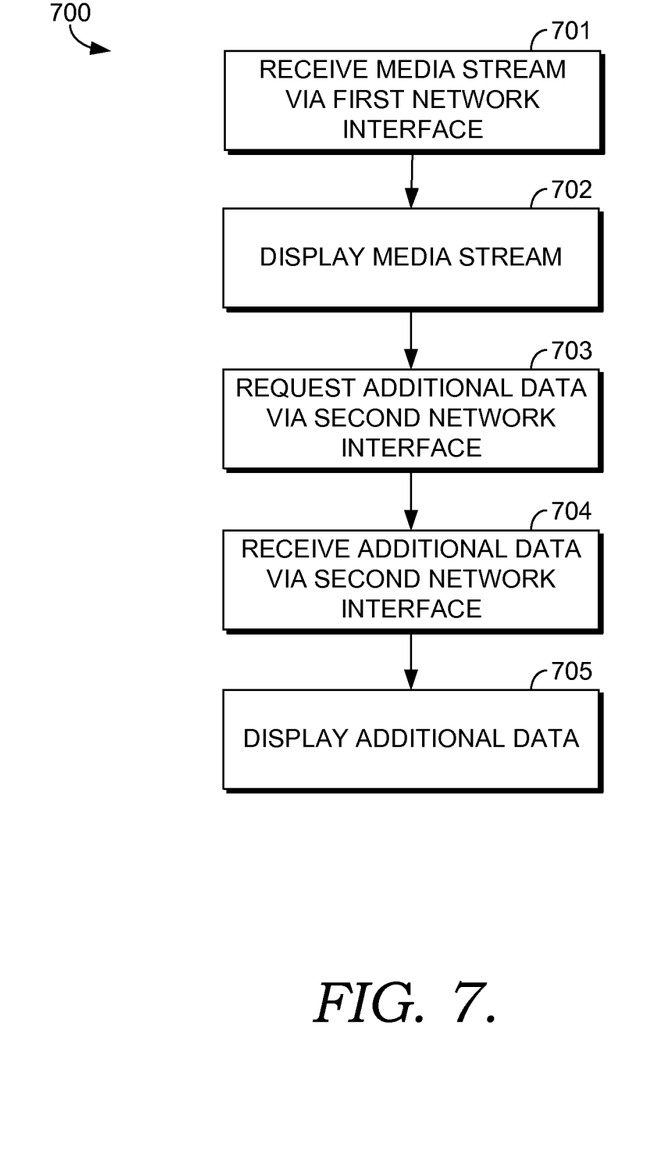
FIG. 7 is a flow diagram showing a method of displaying data related to a media stream, in accordance with an embodiment of the invention.

Turning now to FIG. 7, a flow diagram depicting a method 700 of displaying additional data related to a media stream is given. A media stream is received over an ATSC interface, as shown at block 701. The media stream includes embedded metadata. For example, the media stream could include PSIP compliant metadata. The metadata could include information about title, description, ratings, captioning, language, broadcast flags, and channel information. The media stream is displayed on a screen on the wireless computing device, as shown at block 702. By way of example, the media stream could be displayed in a window on the screen of the wireless computing device.

A connection to a mediation server is established utilizing SIP over a second network interface. Those skilled in the art will recognize that there are many different networking technologies suitable for establishing a connection to a mediation server. By way of example, a CDMA-EVDO interface could be used to establish a connection to the mediation server. As another example, a WiFi interface could be used to establish a connection to the mediation server. The metadata is sent to the mediation server, as shown at block 703 and additional data related to the media stream is received over the second interface from the mediation server, as shown at block 704.

The additional data could be formatted in many different ways. By way of example, the additional data could be formatted using HyperText Markup Language (HTML). As another example, the additional data could be a set of multimedia files including scripts, images and HTML documents. The additional data is displayed on the screen on the wireless computing device simultaneously with the media stream, as shown at block 705. Those skilled in the art will recognize that there are many ways in which the additional data could be displayed simultaneously with the media stream. For example, the additional data could be displayed in a small window that partially overlaps the media stream. As another example, the additional data could be displayed in a window that is tiled next to the window in which the media stream is being displayed.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of displaying additional data related to a mobile video stream, the method comprising:

at a mobile device, receiving from a first source an Advanced Television Systems Committee (ATSC) mobile video stream that includes one or more Program and System Information Protocol (PSIP) metadata items that are compliant with a version of the Program and System Information Protocol, via an Advanced Television Systems Committee (ATSC) network interface, the ATSC interface being coupled to an antenna and a mediation client, wherein the mediation client is configured to take the one or more PSIP metadata items from the mobile video stream and use the one or more PSIP metadata items to form queries for additional data;

at the mobile device, acquiring the one or more PSIP metadata items from the mobile video stream, wherein the one or more PSIP metadata items describe the content of the received mobile video stream;

displaying the mobile video stream on a display device coupled to said mobile device;

establishing a communications link between the mobile device and a mediation server via a second network connection interface coupled to the mediation client, wherein the second network connection interface utilizes a different networking technology than the ATSC network interface;

at the mediation client on the mobile device, forming a query for a search for additional data that is relevant to the content of the mobile video stream, wherein the query includes one or more of the PSIP metadata items embedded in the mobile video stream;

communicating the query from the mobile device to the mediation server through the established communications link via the second network connection interface, wherein the mediation server is configured to process the query by utilizing a search algorithm based on the query to search for additional information related to the content of the mobile video stream, and to provide the additional information to the mobile device in response to the query;

at the mobile device, receiving from the mediation server, via the second network connection interface, the additional data in response to having communicated the query from the mobile device to the mediation server; and utilizing the mobile device to display the additional data.

2. The media of claim 1, wherein the PSIP metadata items include one or more of the following: a title, a ratings indication, captioning information, a language indication, broadcast flags, and channel information.

3. The media of claim 1, wherein displaying the additional data includes displaying the additional data simultaneously with the mobile video stream.

4. The media of claim 1, wherein establishing the communications link between the computing mobile device and the mediation server includes coupling to the mediation server utilizing a Session Initiation Protocol (SIP) link.

5. The media of claim 1, wherein the additional data includes one or more HyperText Markup Language (HTML) files.

6. The media of claim 1, wherein the additional data includes a second mobile video stream.

7. The media of claim 1, wherein the video stream is displayed on an external display device that is coupled to the mobile device, and the additional data is displayed on a display on the mobile device.

8. Non-transitory computer-readable media having computer-executable instructions embodied thereon that, when executed, facilitate a method of displaying additional data related to a mobile video stream that is broadcast from an Advanced Television Systems Committee (ATSC) broadcast tower, the method comprising:

receiving, at a mobile device, the mobile video stream via an ATSC network interface included in the mobile device, wherein the mobile video stream is received from the ATSC broadcast tower, wherein the mobile video stream includes one or more Program and System Information Protocol (PSIP) metadata items that are compliant with a version of the Program and System Information Protocol, and wherein the PSIP metadata items include a title and a description of the content of the received mobile video stream;

at a display on the mobile device, displaying the mobile video stream in a first window;

at the mobile device, taking at least one of the PSIP metadata items embedded in the mobile video stream and forming one or more queries for additional data related to the received mobile video stream and sending the one or more queries to a server via a second network interface, wherein the additional data includes information relevant to the content of the received mobile video stream;

at the mobile device, receiving the additional data from the server via the second network interface; and displaying the additional data received via the second network interface in a second window simultaneously with the mobile video stream received via the ATSC network interface.

9. The media of claim 8, wherein the second network interface includes a Code Division Multiple Access-Evolution Data/Voice (CDMA-EVDO) compatible network interface.

10. The media of claim 8, wherein sending a query to search for additional data includes:

coupling to a mediation server, via the second network interface; and communicating the PSIP metadata items to the mediation server.

11. The media of claim 10, wherein receiving the additional data includes receiving the additional data from the mediation server.

12. The media of claim 10, wherein coupling to the mediation server includes coupling to the mediation server utilizing a Session Initiation Protocol (SIP) link.

13. Non-transitory computer-readable media having computer-executable instructions embodied thereon that, when executed, facilitate a method of displaying additional data related to a mobile video stream, the method comprising:

at a mobile device, receiving a mobile video stream via an Advanced Television Systems Committee (ATSC) network interface, wherein one or more Program and System Information Protocol (PSIP) metadata items that are compliant with a version of the Program and System Information Protocol are included in the mobile video stream, and wherein the one or more PSIP metadata items provide information about the mobile video stream;

at the mobile device, displaying the mobile video stream on a first display device;

coupling the mobile device to a mediation server with Session Initiation Protocol (SIP) over a second network interface, wherein the second network interface is a Code Division Multiple Access-Evolution Data/Voice (CDMA-EVDO) compatible network interface, wherein the mediation server is configured to receive metadata that provide information about a media stream and to process the metadata to search for additional data relevant to the media stream given the metadata that provide information about the media stream;

communicating one or more of the PSIP metadata items from the mobile device to the mediation server;

at the mobile device, receiving the additional data related to the mobile video stream from the mediation server over the Code Division Multiple Access-Evolution Data/Voice (CDMA-EVDO) compatible network interface, wherein the additional data includes information relevant to the mobile video stream, and wherein the additional data is received in response to having communicated the one or more of the PSIP metadata items from the mobile device to the mediation server, and wherein the additional data was located by way of a search based on the one or more of the PSIP metadata items communicated from the mobile device to the mediation server; and at the mobile device, displaying the additional data on a second display device simultaneously with the mobile video stream.

14. The media of claim 8, wherein the additional data is displayed on an external display device that is coupled to the mobile device.

* * * * *